(12) United States Patent
Ozeki

(10) Patent No.: US 9,807,273 B2
(45) Date of Patent: Oct. 31, 2017

(54) INFORMATION PRESENTATION SYSTEM AND INFORMATION PRESENTATION METHOD

(71) Applicant: Oki Data Corporation, Tokyo (JP)

(72) Inventor: Fumitaka Ozeki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/298,157

(22) Filed: Oct. 19, 2016

(65) Prior Publication Data
US 2017/0150005 A1    May 25, 2017

(30) Foreign Application Priority Data

Nov. 20, 2015    (JP) .................................. 2015-227955

(51) Int. Cl.
| | |
|---|---|
| *G06K 15/00* | (2006.01) |
| *H04N 1/32* | (2006.01) |
| *H04N 1/00* | (2006.01) |
| *G06F 3/12* | (2006.01) |
| *H04W 84/18* | (2009.01) |

(52) U.S. Cl.
CPC ..... *H04N 1/32662* (2013.01); *H04N 1/00007* (2013.01); *H04N 1/00029* (2013.01); *H04N 1/00037* (2013.01); *H04N 1/00061* (2013.01); *H04N 1/00079* (2013.01); *H04N 1/00204* (2013.01); *H04N 1/00344* (2013.01); *H04N 2201/0094* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2002/0171860 A1* | 11/2002 | Parry | G06Q 10/025 358/1.14 |
| 2010/0036904 A1* | 2/2010 | Nakamoto | G06F 11/0733 709/202 |
| 2013/0021641 A1* | 1/2013 | Park | G06F 3/121 358/1.14 |

FOREIGN PATENT DOCUMENTS

JP    2008-276693 A    11/2008

* cited by examiner

*Primary Examiner* — Dov Popovici
(74) *Attorney, Agent, or Firm* — Muncy, Geissler, Olds & Lowe, P.C.

(57) ABSTRACT

An information presentation method includes an apparatus information acquisition step to acquire as apparatus information a detection result of detecting a state of an image forming apparatus by a detection part, an input step to let a user of the image forming apparatus input a content to search for about the image forming apparatus as search input information by an input part, a presentation order determination step to read more than one of multiple answers stored in a server device on a symptom that occurred in the image forming apparatus based on the search input information and the apparatus information, the read answers being to be presented to the user, and to determine a presentation order of the answers, and a presentation step to present, by a presentation part, the answers to the user in the presentation order.

8 Claims, 13 Drawing Sheets

*Fig. 4*
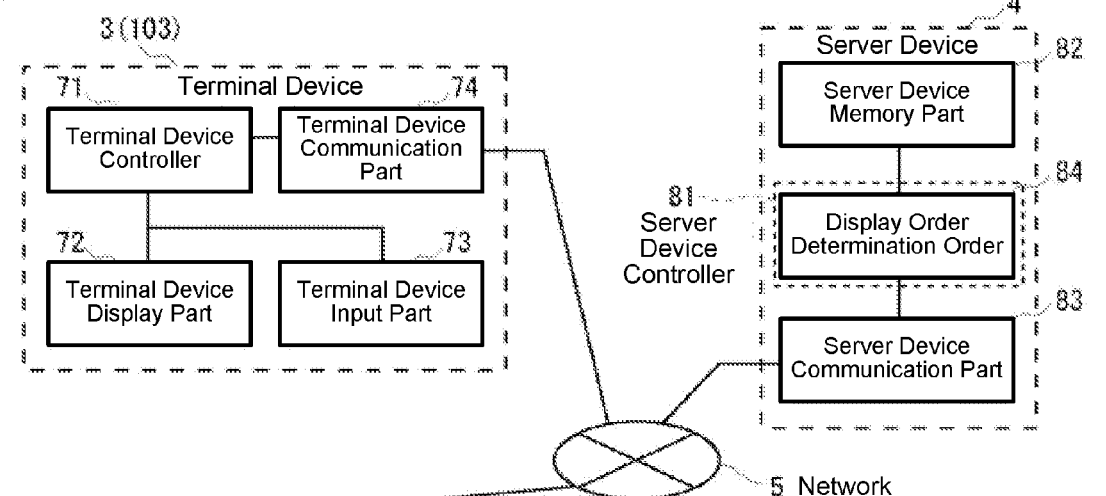
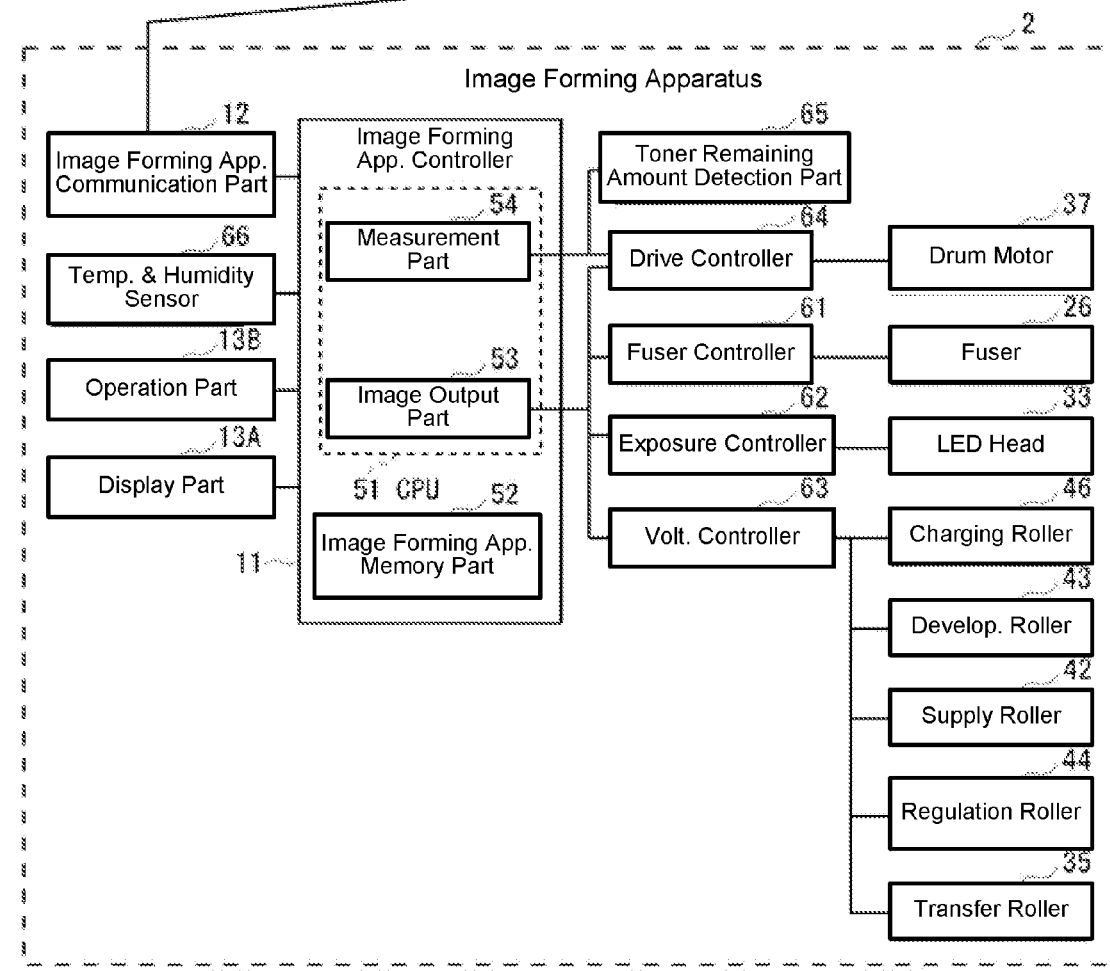

Fig. 8

| Search Keyword | Cause Category | Judgement Items | | | Answers |
|---|---|---|---|---|---|
| | | Toner Low | Drum Rotation No. After Toner Replacement < 500 | Temp. & Humidity Category | |
| Smudge | A: Smear | YES | - | - | Cause: Toner remains low. Coping Method: Replace Toner Cartridge |
| | | NO | NO | A | Cause: Print Correction Does Not Match. Coping Method: Turn Print Correction ON by Operation Panel |
| | B: Fog | NO | YES | - | Cause: Base Correction Does Not Match. Coping Method: Turn Base Correction ON by Operation Panel |
| | | NO | NO | B | Cause: Toner or Smudge Attaches to Sheet Carrying Route. Coping Method: Clean Sheet Carrying Route |
| | C: Others | NO | NO | N | Cause: Damage or Smudge Are Present on Photosensitive Drum. Coping Method: Clean Photosensitive Drum. Replace Developing Unit when Find Damage |

| | | Humidity h [%] | | | | |
|---|---|---|---|---|---|---|
| | | h<15 | 15≦h<35 | 35≦h<55 | 55≦h<75 | 75≦h |
| Temp. t [C°] | t<10 | A | A | A | A | N |
| | 10≦t<15 | A | A | A | N | N |
| | 15≦t<20 | A | A | N | N | B |
| | 20≦t<25 | A | A | N | N | B |
| | 25≦t<30 | A | N | N | B | B |
| | 30≦t | A | N | B | B | B |

Fig. 13

| Search Keyword | Cause Category | Judgement Items | | | Answers |
|---|---|---|---|---|---|
| | | Toner Save Setting | Toner Low | Drum Rotation No. After Toner Replacement < 500 | |
| Density Thin | A: Toner Save Setting | YES | - | - | Cause: Toner Save is ON<br>Coping Method: Change Toner Save Setting |
| | B: Toner Remaining Amount Small | NO | YES | - | Cause: Toner Remaining Low<br>Coping Method: Replace Toner Cartridge |
| | C: Density Correction Error | NO | NO | YES | Cause: No Color Balance is Adjusted<br>Coping Method: Execute Density Correction |
| | D: Others | NO | NO | NO | Cause: Sheet does not fit<br>Coping Method: Change Sheet Thickness Setting<br>Cause: Color Setting Is Changed<br>Coping Method: Confirm Printer Driver Setting |

T4

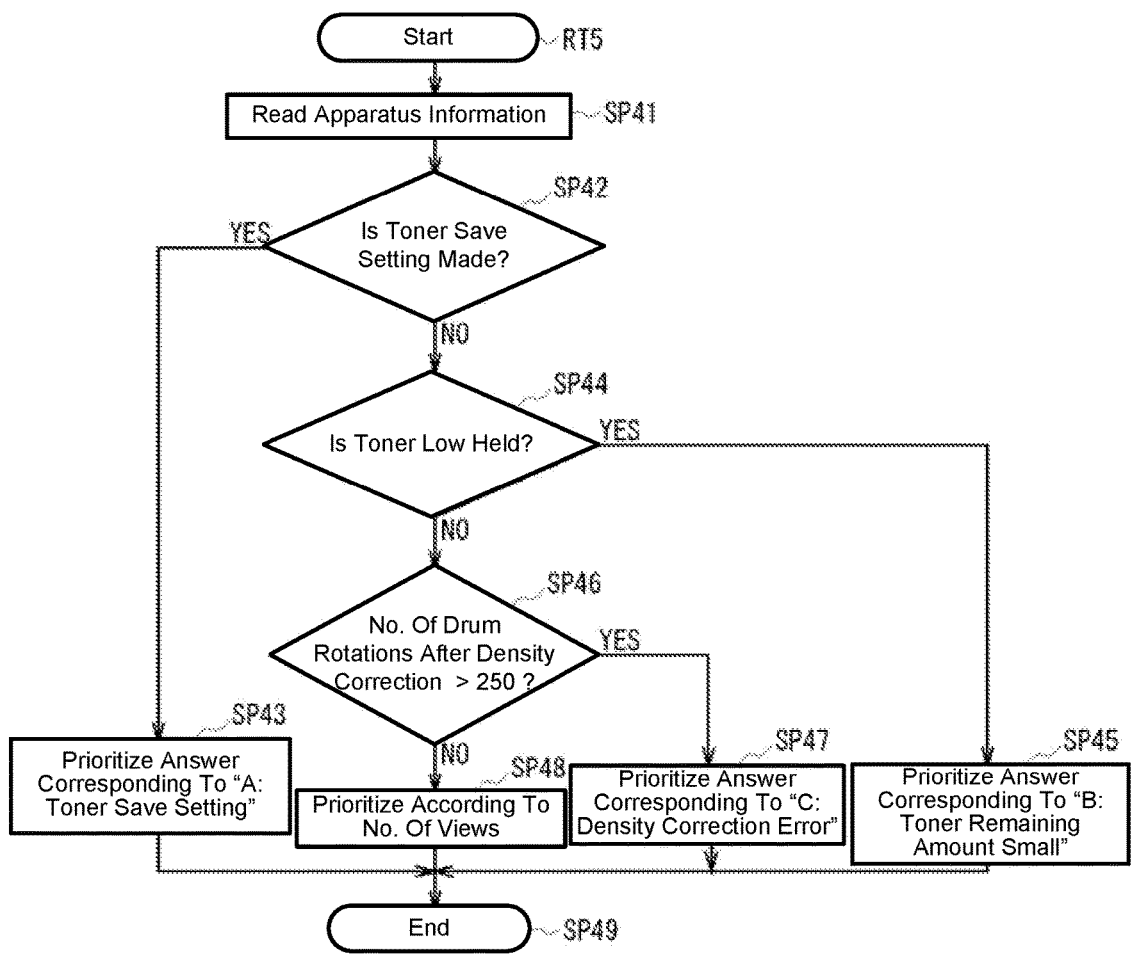

INFORMATION PRESENTATION SYSTEM AND INFORMATION PRESENTATION METHOD

CROSS REFERENCE TO RELATED APPLICATIONS

This application claims priority under 35 USC 119 to Japanese Patent Application No. 2015-227955 filed on Nov. 20, 2015, the entire contents which are incorporated herein by reference.

TECHNICAL FIELD

This invention relates to an information presentation system and an information presentation method, which are suitable for applying to an electrophotographic image forming apparatus (so-called printer) for example.

BACKGROUND

Conventionally, widely prevalent as an image forming apparatus is the one that has, other than an image forming part that forms an image on a medium, a display part and an operation part comprising a touch panel, operation buttons, etc. for displaying various kinds of information and accepting operation instructions by a user.

In this image forming apparatus, in such cases as when the user has operated a designated help button or when the occurrence of an abnormality is detected by various kinds of sensors or the like provided inside, an information presentation program stored in advance is executed, thereby guide information that informs the user of a matter that the user wants to know or a matter that the user should be notified of is displayed on the display part (for example, see Patent Document 1). Thereby, the image forming apparatus can present appropriate information to the user and let the user perform an appropriate work to achieve the dissolution of the abnormality.

RELATED ART

[Patent Doc.] Japanese Laid-Open Patent Publication 2008-276693, see FIG. 14

However, in an image forming apparatus of the conventional configuration, because information is presented according to an information presentation program stored at the time of its manufacturing, no guidance can be provided on matters inquired by many users after manufacturing the image forming apparatus or on methods to deal with abnormalities that newly became evident. That is, there was a problem that the image forming apparatus could not necessarily present appropriate information for the users' requests in some cases.

This invention has been made considering the above respect and attempts to propose an information presentation system and an information presentation method that can present appropriate information to the users.

SUMMARY

An information presentation system disclosed in the application includes image forming apparatus, a terminal device and a server that are connected through a network. The image forming apparatus is provided with an image forming part that forms an image on a medium, a sensor that detects a state of the image forming apparatus, and an image forming apparatus communication part that communicates with the server device, the terminal device is provided with a terminal device input part that lets a user input information, a terminal device presentation part that presents information to the user, and a terminal device communication part that communicates with the server device, the server device is provided with a server device communication part that communicates with the image forming apparatus and the terminal device, a server device memory part that stores multiple answers that are information to be presented to the user in order to cope with symptoms that occur in the image forming apparatus, and a presentation order determination part that determines priority ranks of the answers to present to the user, further the image forming apparatus sends, to the server device by the image forming apparatus communication part, apparatus information including a detection result obtained by the sensor, the terminal device sends, to the server device by the terminal device communication part, search input information for searching for the answers on one of the symptoms that occurred in the image forming apparatus, the search input information being inputted by the user through the terminal device input part, the server device determines the answers and a presentation order of the answers to be presented to the user based on the apparatus information and the search input information, and sends the answers and the presentation order to the terminal device by the server device communication part, and the terminal device presents, to the user by the terminal device presentation part, the answers in the order according to the presentation order.

An information presentation method disclosed in the application includes an apparatus information acquisition step to acquire as apparatus information a detection result of detecting a state of an image forming apparatus by a detection part, an input step to let a user of the image forming apparatus input a content to search for about the image forming apparatus as search input information by an input part, a presentation order determination step to read more than one of multiple answers stored in a server device on a symptom that occurred in the image forming apparatus based on the search input information and the apparatus information, the read answers being to be presented to the user, and to determine a presentation order of the answers, and a presentation step to present, by a presentation part, the answers to the user in the presentation order.

With the invention, it is possible to show the answers and the presentation order of the answers to be presented to the user based on the apparatus information, which are stored in the server device memory part and server device, with respect to the search input information being inputted by the user or the apparatus information obtained from the image forming apparatus. Accordingly, updated answers are to be added to the server device memory part and the server device, or the presentation orders are to be modified based on the numbers of views by other users. With respect to inquiries by users or irregular matters that happen, more beneficial information (or answers) can be selectively/effectively presented to the users.

According to this invention, an information presentation system and an information presentation method that can present appropriate information to the users can be realized.

BRIEF DESCRIPTION OF THE DRAWINGS

FIG. 4 is a block diagram showing the block configuration of the information presentation system.

FIG. 8 is a schematic diagram showing a search keyword information table by the first embodiment.

FIG. 9 is a schematic diagram showing a temperature and humidity table.

FIG. 13 is a schematic diagram showing a search keyword information table by the second embodiment.

FIG. 14 is a flow chart showing a display order determination routine by the second embodiment.

DETAILED DESCRIPTION OF THE EMBODIMENTS

Below, modes for implementing the invention (hereafter called as embodiments) are explained referring to drawings.

Figure 1:
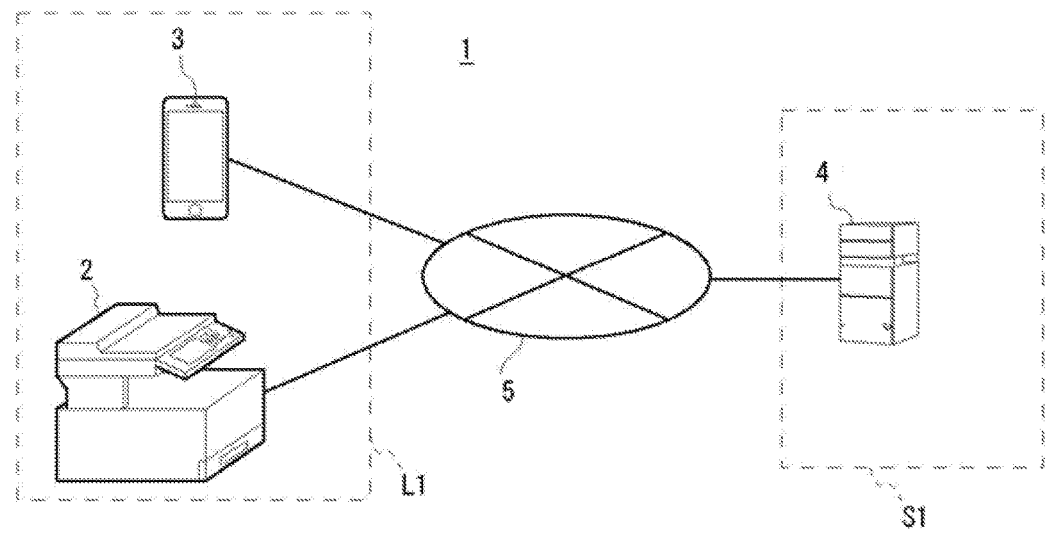
FIG. 1 is a schematic diagram showing the overall configuration of an information presentation system by the first embodiment.

1. First Embodiment 1-1. Configuration of the Information Presentation System As shown in FIG. 1, an information presentation system 1 by the first embodiment has a configuration in which an image forming apparatus 2 that forms an image on a medium, a terminal device 3 comprising a smartphone or the like, and a server device 4 are mutually connected through a network 5.

Among these, the image forming apparatus 2 and the terminal device 3 used by the user are installed in an installation location L1 such as the user's home or work place. On the other hand, the server device 4 is installed in a service center S1 that is away from the installation location L1. The network 5 is the Internet, also called the cloud, that connects devices installed in locations separated from one another and has them exchange information.

The image forming apparatus 2 is so-called an MFP (Multi-Function Peripheral), has a function as an image scanner that reads an image and a communication function other than a printer function that forms an image on a sheet as a medium (that is, prints), and can combine these to operate as a printer, a copier, a facsimile machine, or the like. When functioning as a printer, this image forming apparatus 2 can print a desired color image on a sheet P of A3 size, A4 size, or the like for example.

Figure 2:
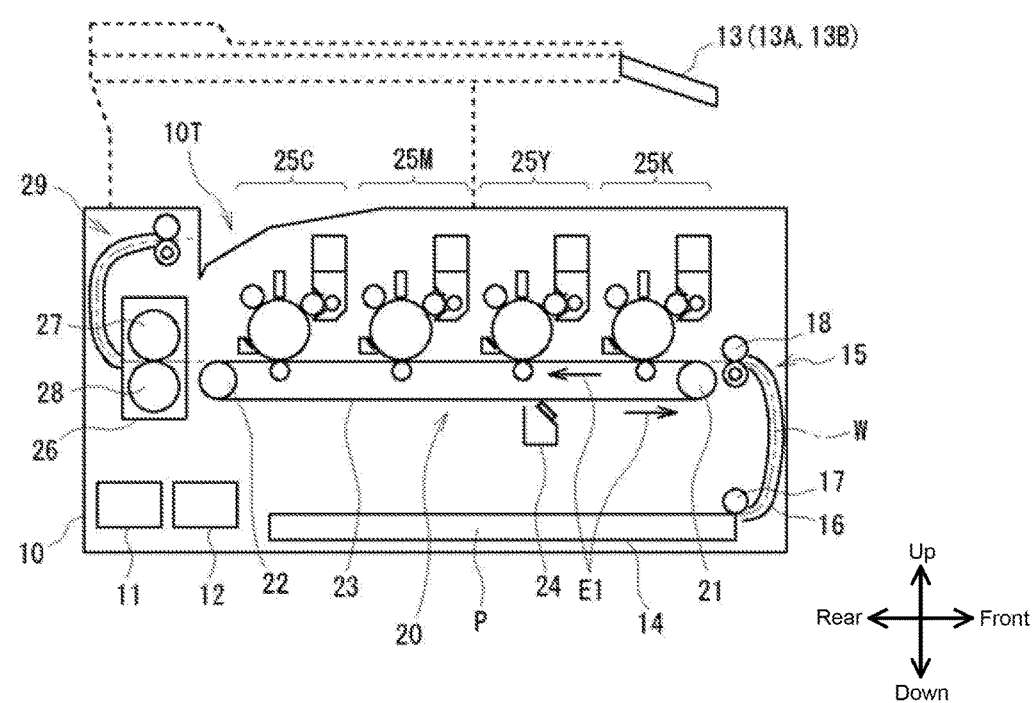
FIG. 2 is a schematic diagram showing the configuration of an image forming apparatus.

As shown in FIG. 2, the image forming apparatus 2 has various kinds of parts disposed inside a printer chassis 10 formed approximately in a box shape. Incidentally, explanations are given below by defining in FIG. 2 the right-end part as the front of the image forming apparatus 2, and the up-down direction, the left-right direction, and the front-rear direction when viewed facing this front.

The image forming apparatus 2 integrally controls the whole by an image forming apparatus controller 11 (shown as Image Forming App. Controller in FIG. 4). This image forming apparatus controller 11 is connected wirelessly or by wire with the terminal device 3 through an image forming apparatus communication part 12 (shown as Image Forming App. Communication Part in FIG. 4). Once given image data expressing a print target image and instructed to print the image data from the terminal device 3, the image forming apparatus controller 11 executes a print process to form a printed image on the surface of the sheet P.

Provided above the printer chassis 10 is a display operation part 13 that displays various kinds of information and accepts user's operation inputs. This display operation part 13 is configured of a touch panel having a liquid crystal panel and a touch sensor integrated for example, and an operation button group consisting of a combination of number buttons, arrow buttons, and the like. For the convenience of explanation, below, the liquid crystal panel of the touch panel is also called a display part 13A, the touch sensor of the touch panel and the operation button group are also called as an operation part 13B.

Provided in the lowest part of the printer chassis 10 are a sheet accommodating cassette 14 that accommodates the sheet P, and a sheet feeding part 15 that separates and feeds a single piece of the sheet P accommodated in a stacked state in the sheet accommodating cassette 14. The sheet feeding part 15 is positioned in the upper front end of the sheet accommodating cassette 14 and has the sheet P proceed along a carrying route W indicated with one-dot chain line.

This sheet feeding part 15 is provided with, in addition to a guide 16 that guides the sheet P, a hopping roller 17 positioned in the upper front end of the sheet accommodating cassette 14, a registration roller 18 disposed in the vicinity of the end of the guide 16, multiple rollers disposed along the guide, etc.

The sheet feeding part 15 rotates the rollers such as the hopping roller 17 by the control of the image forming apparatus controller 11. By rotating, the hopping roller 17 separates and picks up a single piece of the sheet P from the sheet accommodating cassette 14 and has it proceed toward the upper front along the carrying route W. By the rollers rotating, the sheet P proceeds so as to be turned toward the upper rear along the carrying route W while guided by the guide 16, and has its leading edge reach the registration roller 18 in due course. The registration roller 18 applies a resisting force to the sheet P, thereby preventing so-called skew, that is a state where the sides of the sheet become inclined relative to the direction of procession, and hands this sheet P over to a middle carrying part 20 positioned in the rear side.

The middle carrying part 20 has a configuration in which a transfer belt 23 made of an endless belt is looped around an idle roller 21 disposed in the rear vicinity of the registration roller 18 and a drive roller 22 disposed in the rear side.

This middle carrying part 20 has the transfer belt 23 run along an arrow E1 in the figure by rotating the drive roller 22, and has this sheet P proceed in the direction from the front to the rear by mounting the sheet P on the upper side part of the transfer belt 23. That is, the upper side part of the transfer belt 23 forms the carrying route W. Also, provided below the lower side part of the transfer belt 23 is a belt cleaning device 24 that removes toners adhering to the transfer belt 23.

In the upper side of the middle carrying part 20, four image forming units 25C, 25M, 25Y, and 25K are disposed sequentially from the rear side toward the front side along the carrying route W. The image forming units 25C, 25M, 25Y, and 25K (hereafter these are also collectively called as image forming units 25) correspond to individual colors of cyan (C), magenta (M), yellow (Y), and black (K), respectively, and are configured in the same manner, differing in color only.

Figure 3:
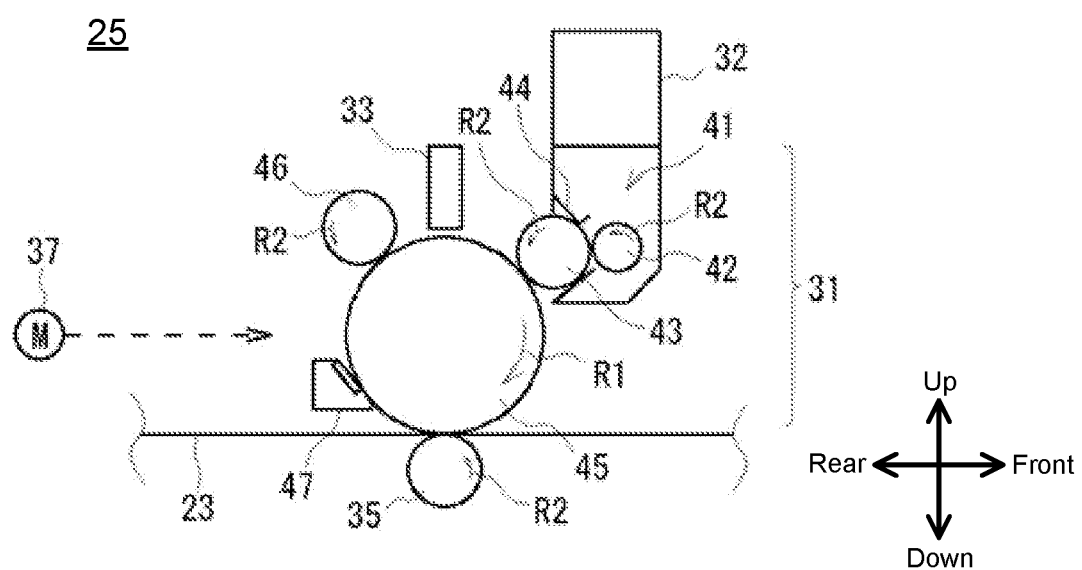
FIG. 3 is a schematic diagram showing the configuration of an image forming unit.

As shown in FIG. 3, each of the image forming units 25 is configured of an image forming part 31, a toner cartridge 32, an LED (Light Emitting Diode) head 33, and a transfer roller 35. The toner cartridge 32 contains a toner as a developer, disposed in the upper side of the image forming part 31, and attached to the upper part of the image forming part 31. This toner cartridge 32 supplies the toner it contains to a toner accommodating part 41 of the image forming part 31.

Incorporated in the image forming part 31 are, other than the toner accommodating part 41, a supply roller 42, a development roller 43, a regulation blade 44, a photosensitive drum 45, and a charging roller 46. The supply roller 42, for example, has as its shaft a conductor made of stainless steel in an elongated columnar shape, and an elastic layer made of a conductive silicone rubber foam or a conductive urethane foam formed on its circumferential side face. Incidentally, there are cases where acetylene black, carbon black, or the like is added to the elastic layer for the purpose of imparting semiconductivity.

The development roller 43 is configured of, for example, a conductive shaft made of a stainless steel material in an elongated columnar shape, an elastic layer formed wrapping around the circumferential side face of the conductive shaft, and a surface layer covering the surface of the elastic layer. Among them, the elastic layer is made of a urethane rubber or a silicone rubber for example. Also, the surface layer is formed by applying a surface treatment on the surface of the elastic layer with a urethane solution, or applying an acrylic resin or an acryl-fluorine copolymer resin. Incidentally, if the surface layer is configured of an acrylic resin or an acryl-fluorine copolymer resin, conductivity is imparted by blending carbon black.

The regulation blade 44 is made of a stainless steel plate of a prescribed thickness for example, and a bending treatment is applied to part of it to form a contact part that contacts with the circumferential side face of the development roller 43. This contact part is adjusted to apply a prescribed linear pressure to the circumferential side face of the development roller 43.

The photosensitive drum 45 has a configuration in which a charge generation layer and a charge transport layer in a thin film shape are sequentially formed on the circumferential side face of an aluminum raw pipe made of aluminum in a cylindrical shape for example. Therefore, the circumferential side face of the photosensitive drum 45 can be charged.

The charging roller 46 has a configuration in which the circumferential side face of an elongated columnar conductor made of stainless steel as a shaft is coated with a conductive elastic body such as epichlorohydrin. This charging roller 46 has its circumferential side face contact with the circumferential side face of the photosensitive drum 45.

With a drive force being supplied from a drum motor 37, this image forming part 31 rotates the supply roller 42, the development roller 43, and the charging roller 46 in the arrow R2 direction (anticlockwise in the figure) and rotates the photosensitive drum 45 in the arrow R1 direction (clockwise in the figure). The image forming part 31 further charges each of the supply roller 42, the development roller 43, the regulation blade 44, and the charging roller 46 by applying a respectively prescribed bias voltage.

The supply roller 42 has a toner inside the toner accommodating part 41 adhere to its circumferential side face by charging, and has this toner adhere to the circumferential side face of the development roller 43 by rotating. After the excess toner is removed from the circumferential side face by the regulation blade 44, the development roller 43 has this circumferential side face contact with the circumferential side face of the photosensitive drum 45.

On the other hand, the charging roller 46 uniformly charges the circumferential side face of the photosensitive drum 45 by contacting with the photosensitive drum 45 in a charged state. The LED head 33 as an exposure device has multiple LED chips disposed linearly along the left-right direction and exposes the photosensitive drum 45 by emitting light at every prescribed time interval with an emission pattern based on image data supplied from the image forming apparatus controller 11 (FIG. 2). Thereby, the photosensitive drum 45 has an electrostatic latent image formed on its circumferential side face in the vicinity of its upper end.

Subsequently, the photosensitive drum 45 rotates in the arrow R1 direction to bring the part having this electrostatic latent image formed into contact with the development roller 43. Thereby, the toner adheres to the circumferential side face of the photosensitive drum 45 based on the electrostatic latent image, and a toner image based on the image data is developed.

The transfer roller 35 is positioned right under the photosensitive drum 45, and nips the upper side part of the transfer belt 23 between the upper end vicinity on its circumferential side face and the lower end vicinity of the photosensitive drum 45. A prescribed bias voltage is applied to this transfer roller 35, and it rotates in the arrow R2 direction by a drive force supplied from the drum motor 37. Thereby, if the sheet P has been carried up along the carrying route W, the transfer roller 35 can transfer the toner image developed on the circumferential side face of the photosensitive drum 45 to this sheet P.

In this manner, the individual image forming units 25 sequentially transfer and superimpose on one another the toner images of their respective colors to the sheet P carried up from the front along the carrying route W and have it proceed toward the rear.

In the vicinity of the rear end of the middle carrying part 20 (FIG. 2), a fuser 26 is provided. The fuser 26 is configured of a heat application roller 27 and a pressure application roller 28. The heat application roller 27 is formed in a cylindrical shape orienting its central axis in the left-right direction, and a heater is provided inside. The pressure application roller 28 is formed in the same cylindrical shape as the heat application roller 27, and presses its upper side surface onto the lower side surface of the heat application roller 27 with a prescribed pressure.

Based on the control by the image forming apparatus controller 11, this fuser 26 heats the heat application roller 27 and rotates the heat application roller 27 and the pressure application roller 28 in their respectively prescribed directions. Thereby, the fuser 26 applies heat and a pressure to the sheet P that is handed over from the image forming units 25, that is the sheet P where the toner images of four colors are superimposed, to fuse the toners, and hands it over toward the rear.

Disposed in the rear of the fuser 26 is a sheet ejection part 29. In the same manner as the sheet feeding part 15, the sheet ejection part 29 is configured of a combination of a guide that guides the sheet P, multiple rollers, etc. By rotating the rollers appropriately according to the control by the image forming apparatus controller 11, this sheet ejection part 29 carries the sheet P handed over from the fuser 26 in the upper rear direction, turns it toward the front, and ejects it to an ejection tray 10T formed on the upper face of the printer chassis 10.

In this manner, in executing the print process, the image forming apparatus 2 forms the toner images by having the LED head 33 (FIG. 3) emit light in each of the image forming units 25 of individual colors, and transfers them sequentially to the sheet P.

Next, the block configuration of the image forming apparatus 2 is explained referring to FIG. 4. The image forming apparatus controller 11 is configured of a CPU (Central Processing Unit) 51 and an image forming apparatus memory part 52 (shown as Image Forming App. Memory Part in FIG. 4) 54, and has this image forming apparatus memory part 52 store various kinds of programs and various kinds of data. Incidentally, the image forming apparatus memory part 52 is configured of nonvolatile memory such as ROM (Read Only Memory), flash memory, and a hard disk drive, and volatile memory such as RAM (Random Access Memory).

The CPU 51 of the image forming apparatus controller 11 reads a prescribed program from the image forming apparatus memory part 52 and executes it to form an image output part 53 and a measurement part 54 as a functional block. When an image print instruction is received through an image forming apparatus communication part 12 from the terminal device 3, or if a prescribed print operation is performed by the operation part 13B, the image output part 53 instructs a fuser controller 61, an exposure controller 62, a voltage controller 63, and a drive controller 64 to perform a print action.

According to this instruction from the image output part 53, the fuser controller 61 controls temperature of the heat application roller 27 in the fuser 26. The exposure controller 62 controls light emission of the LED head 33 based on the image to be printed. The voltage controller 63 controls voltages to apply respectively to the charging roller 46, the development roller 43 (shown as Develop. Roller in FIG. 4), the supply roller 42, the regulation blade 44, and the transfer roller 35. The drive controller 64 control the rotational drive of the drum motor 37.

The measurement part 54 measures the rotation number of the photosensitive drum 45 (FIG. 3) based on the rotation number that the drive controller 64 instructed the drum motor 37. Also, the measurement part 54 has a toner remaining amount detection part 65 detect the voltage value of a toner sensor provided inside each of the image forming units 25 (FIG. 3), and measures the toner remaining amount based on this voltage value.

Further, the measurement part 54 measures temperature and humidity by a temperature and humidity sensor 66. Incidentally, the temperature and humidity sensor 66 is installed in a place such as inside the display operation part 13 where it is hard to be influenced by heat generated by the fuser 26. Thereupon, the measurement part 54 has the image forming apparatus memory part 52 store the obtained rotation number of the photosensitive drum 45, toner remaining amount, temperature, humidity, etc. as the apparatus information.

Incidentally, also stored in the image forming apparatus memory part 52 are the rotation number of the photosensitive drum 45 after the toner cartridge 32 was last replaced (hereafter also called as the number of drum rotations after toner replacement) and the rotation number of the photosensitive drum 45 after a density correction was last performed by a user's operation etc. (hereafter also called as the number of drum rotations after density correction). Also, concerning information on the four image forming units 25, the toner remaining amount, the rotation number, etc. of each of them are stored in the image forming apparatus memory part 52.

The image forming apparatus communication part 12 is connected with the network 5 through a wired LAN (Local Area Network) conforming to a standard such as IEEE (Institute of Electrical and Electronics Engineers) 802.3u/ab or a wireless LAN conforming to a standard such as IEEE 802.11a/b/g/n/ac. While performing prescribed processes such as modulation and demodulation, this image forming apparatus communication part 12 supplies to the image forming apparatus controller 11 various kinds of information and data received through the network 5 from the terminal device 3 and the server device 4, and sends various kinds of information and data supplied from the image forming apparatus controller 11 to the terminal device 3 and the server device 4 through the network 5.

For example, based on a user's operation instruction through the operation part 13B or a prescribed apparatus information sending program, the image forming apparatus controller 11 has the image forming apparatus communication part 12 send the device information stored in the image forming apparatus memory part 52 to the server device 4.

The terminal device 3 is, for example, a portable smartphone or tablet terminal (FIG. 1) and is configured of a terminal device controller 71, a terminal device display part 72, a terminal device input part 73, and a terminal device communication part 74. As mentioned above, this terminal device 3 is used by the same user as the image forming apparatus 2 in the same installation location L1 as the image forming apparatus 2.

In the same manner as the image forming apparatus controller 11, the terminal device controller 71 is configured of a CPU, a memory part, etc. that are not shown, and realizes various kinds of functions by reading and executing various kinds of programs stored in the memory part. The terminal device display part 72 is a liquid crystal panel for example, and displays various kinds of information. The terminal device input part 73 comprises a touch sensor for example, and accepts the user's input operations. Incidentally, the terminal device display part 72 and the terminal device input part 73 are, for example, configured as a touch panel having the liquid crystal panel and the touch sensor integrated in the same manner as the display operation part 13 of the image forming apparatus 2.

The terminal device communication part 74 is connected with the network 5 through a wireless LAN conforming to a standard such as IEEE 802.11a/b/g/n/ac. While performing prescribed processes such as modulation and demodulation, this terminal device communication part 74 supplies to the terminal device controller 71 various kinds of information and data received through the network 5 from the image forming apparatus 2 and the server device 4, and sends various kinds of information and data supplied from the terminal device controller 71 to the image forming apparatus 2 and the server device 4 through the network 5.

Based on such configuration as this, the terminal device 3 performs various kinds of communications with the server device 4 through the network 5, executes various kinds of programs according to the user's operation inputs, and displays various kinds of information on the display screen.

The server device 4 is connected to the network 5 (that is, the cloud) and is also called a cloud server. This server device 4 is configured of a server device controller 81, a server device memory part 82, and a server device communication part 83. The server device controller 81 is configured centering on an unshown CPU and executes various kinds of arithmetic processes according to various kinds of programs etc.

In the same manner as the image forming apparatus memory part 52, the server device memory part 82 is configured of nonvolatile memory such as a ROM, a flash memory, and a hard disk drive, and volatile memory such as a RAM. This server device memory part 82 has rewritable memory such as the flash memory and the hard disk drive store various kinds of programs in advance, and successively store the apparatus information received from the image forming apparatus 2. Also, the server device controller 81 reads and executes various kinds of programs stored in this server device memory part 82, thereby realizing various kinds of functional blocks such as a display order determination part 84.

The server device communication part 83 is connected with the network 5 through a wired LAN conforming to a standard such as IEEE 802.3u/ab. While performing prescribed processes such as modulation and demodulation, this server device communication part 83 supplies to the server device controller 81 various kinds of information and data received through the network 5 from the image forming apparatus 2 and the terminal device 3, and also sends various kinds of information and data supplied from the server device controller 81 to the image forming apparatus 2 and the terminal device 3 through the network 5.

Based on this kind of configuration, the server device 4 receives and has the server device memory part 82 store information such as the apparatus information from the image forming apparatus 2 for example, accepts various kinds of requests through the network 5 from the terminal device 3 etc., executes various kinds of processes according to these requests, and sends the execution result to the terminal device 3.

Incidentally, the server device 4 can also connect with other image forming apparatuses (not shown) through the network 5 to receive the apparatus information and also execute various kinds of processes according to requests from other terminal devices (now shown).

1-2. Search Sequence

By the way, in the information presentation system 1, when a symptom that a user should cope with has occurred in the image forming apparatus 2, etc., the user is allowed to use the terminal device 3 and search for the content he wants to know. At this time, the information presentation system 1 performs a search process following a sequence chart in FIG. 5 while information is mutually exchanged among the image forming apparatus 2, the terminal device 3, and the server device 4.

Specifically, once the power is injected, the image forming apparatus controller 11 of the image forming apparatus 2 starts a routine RT1 and moves to SP1. At SP1 the image forming apparatus part 11 waits for an input operation by the user through the operation part 13B in a state where a prescribed menu screen (not shown) is displayed on the display part 13A, and once "Cloud server connection menu" is selected from multiple menu items, moves to the next SP2.

At SP2 the image forming apparatus controller 11 connects with the server device 4 through the image forming apparatus communication part 12, sends the apparatus information stored in the image forming apparatus memory part 52, and moves to the next SP3. Here, the apparatus information includes, for example, the number of printed sheets, the remaining amounts of toners of individual colors, the lives of consumables such as the fuser and the transfer belt, the results of temperature and humidity measurements, the content of setting by the user such as the sheet size, etc.

On the other hand, the server device controller 81 of the server device 4 has already started a routine RT3 by executing a prescribed program in advance, at SP21 connects with the image forming apparatus 2 through the server device communication part 83 to receive the apparatus information, has the server device memory part 82 store it, and afterwards moves to the next SP22.

At SP22, in response to receiving the apparatus information from the image forming apparatus 2, the server device controller 81 generates a new unique connection code. This connection code is, for example, a combination of four alphabets and four numbers, and is generated every time the apparatus information is received. Also, the server device controller 81 has the server device memory part 82 store this connection code in correspondence to the received apparatus information, sends it to the image forming apparatus 2 by the server device communication part 83, and moves to the next SP23.

In response to this, at SP3 the image forming apparatus controller 11 has the image forming apparatus communication part 12 receive the connection code from the server device 4, further has the display part 13A display a guide screen (not shown) including this received code, and afterwards moves to the next SP4, finishing the routine RT1. Thereby, the image forming apparatus controller 11 can notify the user of the connection code.

By the way, also displayed on the guide screen displayed on the display part 13A, other than the connection code, is an explanation on the search process utilizing the terminal device 3. Then, the user operates the terminal device 3 according to this explanation, thereby executing a prescribed program (application) corresponding to the image forming apparatus 2.

Specifically, according to the user's input operation through the terminal device input part 73, the terminal device controller 71 reads the prescribed program from a memory part (not shown) and executes it, thereby starting a routine RT2, and moves to SP11. At SP11 the terminal device controller 71 displays a menu screen D1 shown in FIG. 6A on the terminal device display part 72.

This menu screen D1 is made so-called a GUI (Graphical User Interface), displaying three menu items M1, M2, and M3 as "Cope with Device Error", "Examine and Solve", and "Diagnose Troubles in Image Quality". Each of the menu items M1, M2, and M3 also functions as an input button to accept a selection by a touch operation through the terminal device input part 73.

Figure 6C:
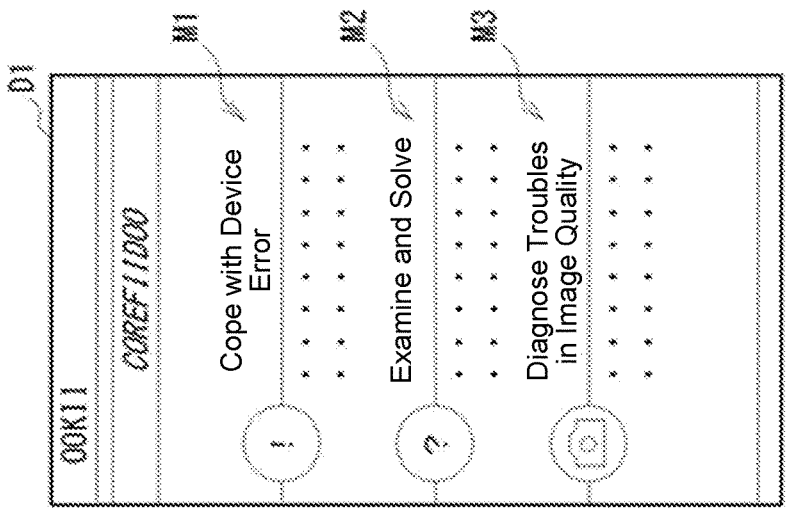
FIGS. 6A-6C are schematic diagrams showing the display screens of a terminal device by the first embodiment.
Figure 6B:
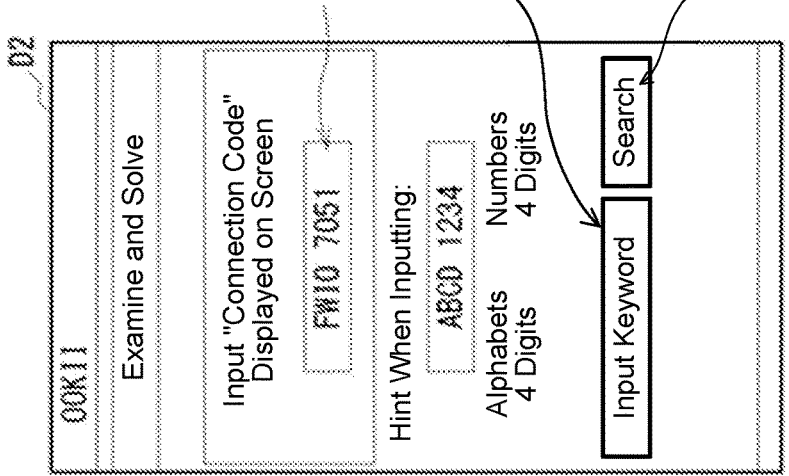

If a touch operation is performed to the menu item M2 displaying "Examine and Solve" on this menu screen D1, the terminal device controller 71 moves to the next SP12. At this time, an input screen D2 shown in FIG. 6B is displayed on the terminal device display part 72. This input screen D2 is made a GUI in the same manner as the menu screen D1 (FIG. 6A), displaying an input column C1 for inputting the connection code, a free word input column C2 for inputting a search free word, and a search button B1 for instructing the start of a search process.

At SP12 the terminal device controller 71 lets the user input the connection code displayed on the display part 13A of the image forming apparatus 2 into the input column C1 of the input screen D2. Upon that, at SP13 the terminal device controller 71 lets the user input a search free word in the free word input column C2 and perform a touch operation on the search button B1, thereby sends the connection code and the search free word to the server device 4, and moves to the next SP14. Incidentally, in the free word input column C2, at least one word or sentence can be inputted as the search free word.

In response to this, at SP23 the server device controller 81 receives the connection code sent from the terminal device 3 (hereafter called received connection code) and the search free word, and moves to the next SP24. At SP24 the server device controller 81 applies a prescribed analysis process to the search free word, further refers to a search synonym table T1 shown in FIG. 7, thereby determines a search keyword, and moves to the next SP25.

In this search synonym table T1, multiple "synonyms" are given correspondence to one "search keyword". Among them, the "search keyword" is a word or phrase defined as a term expressing the symptom of an abnormality or inconvenience in the image forming apparatus 2, and as mentioned below, the coping method etc. are prepared in advance. On the other hand, the "synonyms" are words or phrases having a high relevance to the "search keyword", and each of them is supposed to be inputted by the user as the search free word. Therefore, by referring to this search synonym table T1, the server device controller 81 can convert the search free word inputted arbitrarily by the user to a search keyword for which the coping method is prepared in advance while maintaining the user's intention as much as possible.

At SP25 the server device controller 81 executes the below-mentioned information display order determination process as a subroutine, thereby determines the priority ranks based on the state of the image forming apparatus 2 for multiple pieces of information given correspondence to the search keyword, and moves to the next SP26. At SP26 the server device controller 81 sends the multiple pieces of information given correspondence to the search keyword and their priority ranks to the terminal device 3, and afterwards moves to the next SP27, finishing the routine RT3. The multiple pieces of information corresponding to the search keyword are "presentation information" or "answers" of the invention. The priority ranks above is "presentation order" of the invention. Through the invention, the "presentation information" or "answers" is not necessary a solution to cope with a symptom occurred on the apparatus. It may be only a cause or possible reason for the symptom.

In response to this, the terminal device controller 71 moves to SP14 and receives the multiple pieces of information expressing the search result and their priority ranks from the server device 4 through the terminal device communication part 74. Subsequently, as shown in FIG. 6C, the terminal device controller 71 displays a search result display screen D3 on the terminal device display part 72, thereby presenting the multiple pieces of information received from the server device 4 to the user in the order according to their priority ranks, and afterwards moves to the next SP15, finishing the routine RT2. At this time, the user can refer to the information displayed on the search result display screen D3 sequentially in the descending order of priority rank, and take a coping action according to the displayed content.

1-3. Information Display Order Determination Process

By the way, as shown in FIG. 8, stored in advance in the server device memory part 82 of the server device 4 is a search keyword information table T2 that has various kinds of information correspond to each search keyword. Stored in this search keyword information table T2 are conditions to narrow down the search result and answers to be presented when the user has searched for a content he wanted to know about the image forming apparatus 2.

In the search keyword information table T2, one search keyword is given correspondence to at least one "cause category", and further each "cause category" is given correspondence to "judgement item" and "answer".

Among these, stored in the cause category is a word or phrase that expresses in more detail the symptom and its cause for the search keyword. Here, if multiple cause categories are given correspondence to one search keyword, it signifies that multiple causes are considered. In other words, if multiple cause categories are given correspondence to one search keyword, the search keyword alone cannot specify which cause category corresponds to the symptom that is actually occurring in the image forming apparatus 2.

Then, in the search keyword information table T2, a judgement condition is set in every one of at least one judgement item for each cause category. Set as each judgement item is information relevant to the search keyword among the apparatus information sent from the image forming apparatus 2. Specifically, set as the judgement items in the search keyword information table T2 for the search keyword "smudge" for example are "Toner Low", "Number of drum rotation after toner replacement <500", and "Temperature and humidity category".

Set as the judgement condition set for each of these judgement items is a condition that should be satisfied if the cause category applies. For example, in the judgement item "Toner Low", a logical value such as "YES" or "NO" is set as the judgement condition. This judgement item "Toner Low" is a value expressing whether the toner remaining amount included in the apparatus information is equal to or less than a prescribed threshold value, and becomes "YES" if it is below this threshold value, and "NO" if it exceeds this threshold value.

Also, as the judgement condition, a code such as "A", "B", or "N" may be set in cases such as the judgment item "Temperature and humidity category". This temperature and humidity category is classified into three varieties of "A", "B", and "N" depending on the combination of temperature t [° C.] and humidity h [%] according to a temperature and humidity table T3 shown in FIG. 9.

In this temperature and humidity table T3, the case where temperature is relatively low and humidity is also relatively low, that is, the case where the amount of water contained in the air is relatively small is denoted as the temperature and humidity category "A", and conversely the case where temperature is relatively high and humidity is also relatively high, that is, the case where the amount of water contained in the air is relatively large is denoted as the temperature and humidity category "B". Also, in the temperature and humidity table T3, the case that does not correspond to either the temperature and humidity category "A" or "B" is denoted as the temperature and humidity category "N". This temperature and humidity table T3 is stored in advance in the server device memory part 82 in the same manner as the search keyword information table T2 (FIG. 8).

Stored in the "answer" of the search keyword information table T2 (FIG. 8) is a content that should be presented to the user as a search result. Specifically, contained are the "cause" why "smudge" that is the search keyword occurred, and the "coping method" the user should perform to solve it. For the presentation information of the invention, the "cause" and "coping method" above are available. The coping method is to be included in the presentation information.

Further, the search keyword information table T2 can be updated at an arbitrary timing. For example, in the search keyword information table T2, there are a case where a cause category or judgement condition that is newly discovered by a company in charge of the development and/or maintenance of the image forming apparatus 2 is added, a case where the priority ranks of the individual pieces of information are changed according to the frequencies they were referred to by each user, etc.

Figure 10:
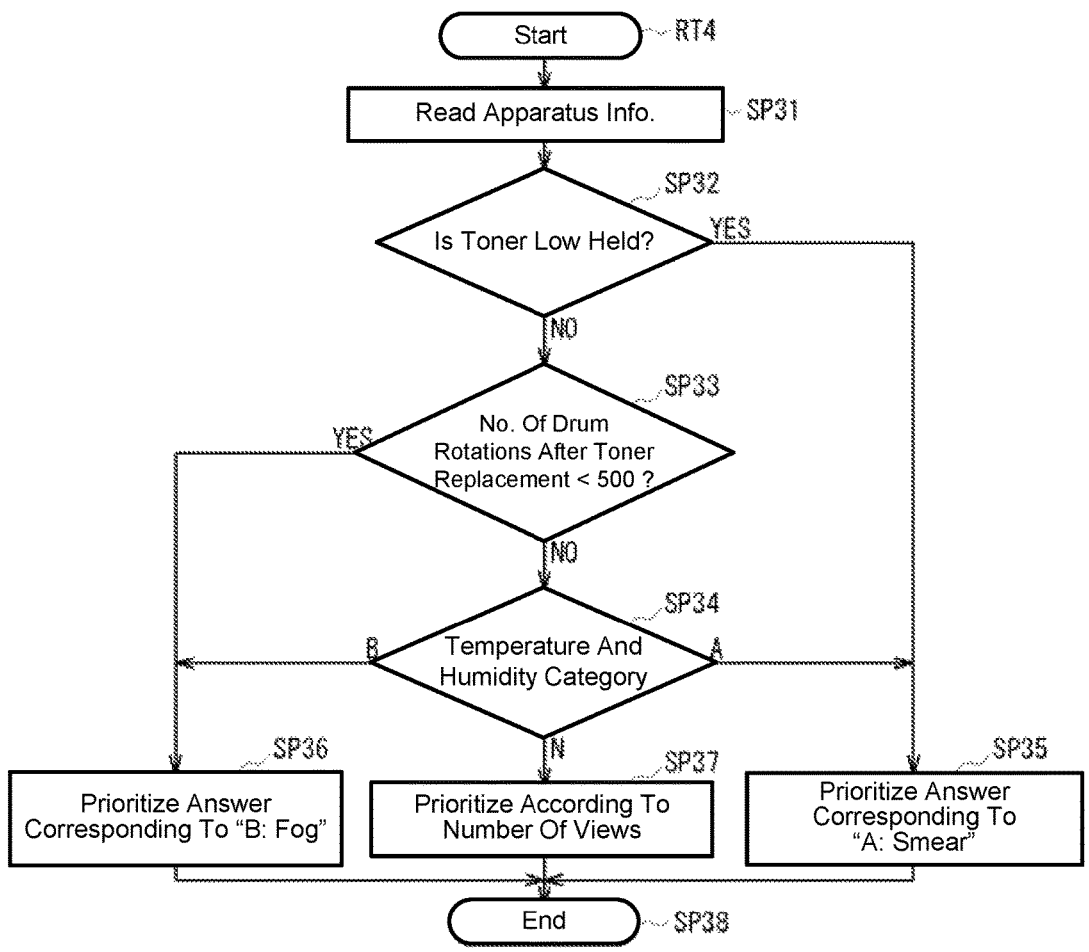
FIG. 10 is a flow chart showing a display order determination routine by the first embodiment.

In fact, the server device controller 81 of the server device 4 determines the information display order while referring to this search keyword information table T2 and the temperature and humidity table T3. Specifically, while executing a routine RT3 of the search sequence (FIG. 5), at SP25 the server device controller 81 reads the information display order determination program from the server device memory part 82 and executes it, thereby configuring a display order determination part 84 (FIG. 4) as a functional block inside itself. This display order determination part 84 starts a display order determination routine RT4 shown in FIG. 10, and moves to SP31. The display order determination part corresponds to a presentation order determination part of the invention.

At SP31 the display order determination part 84 reads from the server device memory part 82 the apparatus information given correspondence to the connection code received at SP23 (FIG. 5) (that is, the received connection code), and moves to the next SP32.

At this time, the display order determination part 84 reads items in the apparatus information corresponding to the determined search keyword "smudge", that is, information relevant to the judgement item registered in the search keyword information table T2 (FIG. 8). Specifically, the server device controller 81 reads the individual values of "Toner remaining amount", "Number of drum rotations after toner replacement", "Temperature", and "Humidity" included in the apparatus information. Thereby, the server device controller 81 becomes capable of performing a judgement process based on both the search free word sent from the terminal device 3 and the apparatus information in the image forming apparatus 2.

At SP32 the display order determination part 84 judges whether Toner Low holds, that is, whether the toner remaining amount is below the prescribed threshold value. If a positive result is obtained here, it indicates that this corresponds to the only case where the judgement condition in the judgement item "Toner Low" is "YES" in the search keyword information table T2 (FIG. 8), that is, the case where the cause category is "A: Smear". Also, this signifies that it is estimated that because the amount of the toner accommodated in the toner cartridge 32 or the toner accommodating part 41 (FIG. 3) is relatively small, the toner is excessively charged. At this time, the display order determination part 84 moves to the next SP35.

On the other hand, if a negative result is obtained at SP32, it indicates that the cause category needs to be specified based on a judgement item other than "Toner Low". At this time, the display order determination part 84 moves to the next SP33.

At SP33 the display order determination part 84 judged whether the number of drum rotations after toner replacement is below the value of "500". If a positive result is obtained here, it indicates that this corresponds to the only case where the judgement condition in the judgement item "Number of drum rotations after toner replacement <500" is "YES" in the search keyword information table T2 (FIG. 8), that is, the case where the cause category is "B: Fog". Also, this signifies that the rotation number of the photosensitive drum 45 after the toner cartridge 32 was replaced is relatively small, and that the charge amount of each toner is relatively small. At this time, the display order determination part 84 moves to the next SP36.

On the other hand, if a negative result is obtained at SP32, it indicates that the cause category needs to be specified based on a judgement item other than "Toner Low" or "Number of drum rotations after toner replacement <500", that is, "Temperature and humidity table value". At this time, the display order determination part 84 moves to the next SP34.

At SP34 the display order determination part 84 judges which of "A", "B", or "N" the temperature and humidity category is, referring to the temperature and humidity table T3 based on the temperature and humidity values read from the apparatus information. Here, if the temperature and humidity category is "A", it indicates that this corresponds to the only case where the judgement condition in the judgement item "Temperature and humidity category" is "A" in the search keyword information table T2 (FIG. 8), that is, the case where the cause category is "A: Smear". Also, it indicates that it is estimated that because the amount of water contained in the air is relatively small, the toner is excessively charged. At this time, the display order determination part 84 moves to the next SP35.

At SP35 the display order determination part 84 determines priority ranks so as to prioritize the answer corresponding to the cause category "A: Smear", and moves to the next SP38. This "A: Smear" expresses a symptom that an excess toner adheres to part of a printed sheet due to an excessive charge of the toner etc. That is, based on the apparatus information, the display order determination part 84 judges that the cause category for the search keyword "smudge" is "A: Smear", and can preferentially present the corresponding information to the user.

Also, if the temperature and humidity category is "B" at SP34, it indicates that this corresponds to the only case where the judgement condition in the judgement item "Temperature and humidity category" is "B" in the search keyword information table T2 (FIG. 8), that is, the case where the cause category is "B: Fog". Also, it indicates that it is estimated that because the amount of water contained in the air is relatively large, the toner charge amount is relatively small. At this time, the display order determination part 84 moves to the next SP36.

At SP36 the display order determination part 84 determines priority ranks so as to prioritize the answer corresponding to the cause category "B: Fog", and moves to the next SP38. This "B: Fog" expresses a symptom that an excess toner adheres thinly spread to the whole surface of a printed sheet due to a too small charge of the toner etc. That is, based on the apparatus information, the display order determination part 84 judges that the cause category for the search keyword "smudge" is "B: Fog", and can preferentially present the corresponding information to the user.

Further, if the temperature and humidity category is "N" at SP34, it indicates that this corresponds to the only case where the judgement condition in the judgement item "Temperature and humidity category" is "N" in the search keyword information table T2 (FIG. 8), that is, the case where the cause category is "C: Others". Also, it indicates that it is estimated that the amount of water contained in the air is roughly appropriate, and the toner charge amount is proper, therefore a cause other than the toner charge amount exists. At this time, the display order determination part 84 moves to the next SP37.

At SP37 the display order determination part 84 determines priority ranks for the multiple answers corresponding to the cause category "C: Others" according to the number of views by other users, and moves to the next SP38. This "C: Others" expresses a symptom that a smudge is occurring to the print result in a different mode from any of "A: Smear" or "B: Fog". That is, the display order determination part 84 judges that the cause for the search keyword "smudge" cannot be specified based on the apparatus information, and can have information presented to the user based on the priority ranks according to the number of views by other users.

At SP38 the display order determination part 84 finishes the display order determination routine RT4 and returns its control to the server device controller 81. The server device controller 81 returns to the routine RT3 in the search sequence (FIG. 5), moves to the next SP26, and performs the above-mentioned process.

1-4. Effects Etc.

In the above configuration, the information presentation system 1 by the first embodiment is designed so that a matter the user wants to know about the image forming apparatus 2 is inputted to the terminal device 3 as a search free word, a judgement process based on the search keyword information table T2 (FIG. 8) is performed in the server device 4, and information is presented to the user upon determining the priority ranks. Also, the information presentation system 1 is designed so that the search keyword information table T2 can be updated.

Therefore, the information presentation system 1 can display information on the content corresponding to the search free word in an appropriate order according to the priority ranks determined according to the most recent search keyword information table T2 in the server device 4.

That is, in the information presentation system 1, if a new symptom or its coping method has become evident after shipping the image forming apparatus 2, although this coping method is not stored in the image forming apparatus memory part 52 (FIG. 4), by updating the search keyword information table T2 etc. stored in the server device 4, an appropriate coping method can be presented to the user.

Also, the information presentation system 1 is designed so that if "Cloud server connection menu" is selected by the user's operation in the image forming apparatus 2, the apparatus information is sent to the server device 4, and the connection code generated according to this is received and displayed on the display part 13A. Subsequently, in the terminal device 3, the search free word and the connection code are inputted by the user's operation, and these are sent to the server device 4.

Therefore, in a search process requested by the terminal device 3 that is originally unrelated to the image forming apparatus 2, the information presentation system 1 can specify this image forming apparatus 2 by having also the connection code inputted, and can present information according to the priority ranks based on the apparatus information obtained from the image forming apparatus 2. In other words, in the information presentation system 1, because the terminal device 3 can be made function as if it were part of the image forming apparatus 2, the user is allowed to use a familiar character input interface etc., enhancing operability and information viewability.

Also, in the information presentation system 1, the apparatus information including diverse information on the image forming apparatus 2 is sent to and stored by the server device 4 in advance, and a relatively short connection code (of 8 characters for example) is uniquely generated for specifying this apparatus information. Subsequently, in the information presentation system 1, this connection code is sent from the server device 4 to the image forming apparatus 2 and displayed on the display part 13A of the image forming apparatus 2 to notify the user. Therefore, in the information presentation system 1, by merely having the user input a tiny number of characters (8 characters for example) to the terminal device 3, the apparatus information made of enormous information on the image forming apparatus 2 can be effectively utilized in the search process.

Further, in the search keyword information table T2 (FIG. 8), at least one cause category is given correspondence to one search keyword, at least one judgement item utilizing the apparatus information is prepared for each cause category, and a judgement condition according to each cause category is set. Therefore, in the information presentation system 1, even if the user inputs a relatively abstract free word, by making a judgement according to the judgement condition based on the apparatus information expressing the detailed state of the image forming apparatus 2, which cause category applies can be appropriately specified, and an appropriate coping method can be presented to the user.

In general, in an information search process, multiple pieces of information used to be presented to the user after increasing the priority ranks of the pieces of information that have high relevancy to a search keyword or high frequency of references by other users among the information accumulated in a server. However, in this case, the user needs to select needed information from the multiple pieces of information displayed as a search result by considering them. In many cases, because the user is not necessarily familiar to the image forming apparatus 2, it used to be difficult to select appropriate information that could solve a symptom.

In this respect, the information presentation system 1 can have the server device 4 execute the same search process as if a word or phrase expressing precisely the symptom of the image forming apparatus 2 were added by having the user input the connection code in addition to the search free word, and can present to the user an appropriate coping method for this symptom.

For example, when the user recognizes that a "smudge" has occurred on a sheet printed in the image forming apparatus 2, the user inputs "smudge" or a similar word or phrase as the search free word. However, in the image forming apparatus 2, as the cause category where a "smudge" occurs, there are the case of "Smear" where an excess toner adheres to only part of the sheet mainly because the toner charge is excessive, and the case of "Fog" where a toner adheres thinly spread to the whole surface of the sheet because the toner charge is too small. Therefore, in the image forming apparatus 2, the coping method greatly differs between the case of "Smear" and the case of "Fog" because their toner charge states are completely opposite.

Even in such a case as this, by utilizing the apparatus information in addition to the search keyword, the information presentation system 1 can have the server device 4 properly grasp the state of the image forming apparatus 2 and can present an appropriate coping method to the user.

Also, in another point of view, the image forming apparatus 2 has various kinds of sensors etc. incorporated, and can appropriately detect the toner remaining amount, the rotation number of the photosensitive drum 45, etc. and notify the server device 4 of this as the apparatus information. However, there are cases where the image forming apparatus 2 cannot appropriately detect them with the sensors etc., depending on the content of the symptom such as the occurrence of a smudge on a printed sheet. That is, in the information presentation system 1, if the search process had been performed having only the connection code inputted, there was a possibility that the coping method for the symptom the user wanted to solve could not be preferentially presented.

In this respect, in the information presentation system 1, by having information that cannot be detected with the sensors etc. alone inputted as the search free word based on the user's sense, the accuracy of information grasped by the server device 4 on the image forming apparatus 2 can be enhanced, allowing a search process with higher accuracy to be performed.

Further, in the information presentation system 1, while increasing the priority ranks of the pieces of information given correspondence to the specified cause category, other pieces of information are presented in the state of relatively low priority ranks instead of not being presented. Therefore, in the information presentation system 1, if the pieces of information with high priority ranks presented to the user are not the information the user wanted, there is no need to perform another search, and the pieces of information with lower priority ranks can be easily referred to through an operation such as scrolling.

According to the above-mentioned configuration, the information presentation system 1 by the first embodiment has the search free word expressing a matter the user wants to know about the image forming apparatus 2 and the connection code displayed on the image forming apparatus 2 inputted to the terminal device 3. Subsequently, the information presentation system 1 performs the judgement process based on the search keyword while utilizing the apparatus information in the server device 4, determines the priority ranks according to the specified cause category, and presents the information to the user. Therefore, the information presentation system 1 can present the most recent information updated successively in the server device 4 to the user by the appropriate priority ranks determined according to the state of the image forming apparatus 2, and can allow the user to cope appropriately with the symptom occurring in the image forming apparatus 2.

2. Second Embodiment

Figure 11:
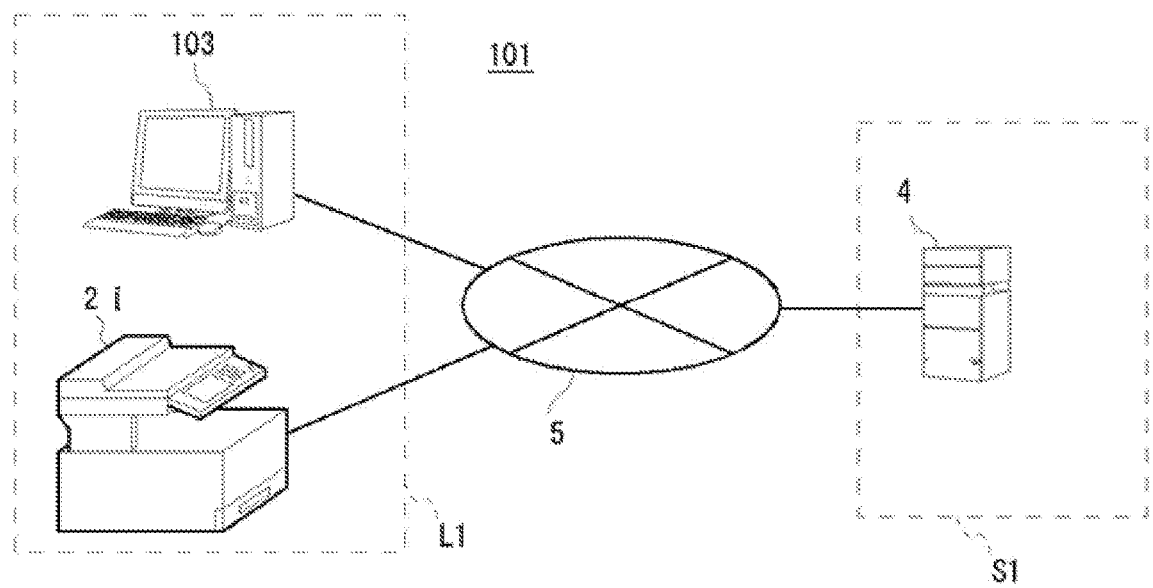
FIG. 11 is a schematic diagram showing the overall configuration of an information presentation system by the second embodiment.

As shown in FIG. 11 corresponding to FIG. 1, although an information presentation system 101 by the second embodiment is different in having a terminal device 103 substituting for the terminal device 3 in comparison with the information presentation system 1 by the first embodiment, they are configured in the same manner in other respects.

The terminal device 103 is so-called a desktop-type computer device, and a display, a keyboard, and a mouse are connected to the device main body. As shown in FIG. 4, this terminal device 103 has the same block configuration as the terminal device 3 by the first embodiment, and comprises a terminal device controller 71, a terminal device display part 72, terminal device input part 73, and a terminal device communication part 74. Among them, the terminal device display part 72 is the above-mentioned display, and the terminal device input part 73 consists of the keyboard and the mouse.

Figure 5:
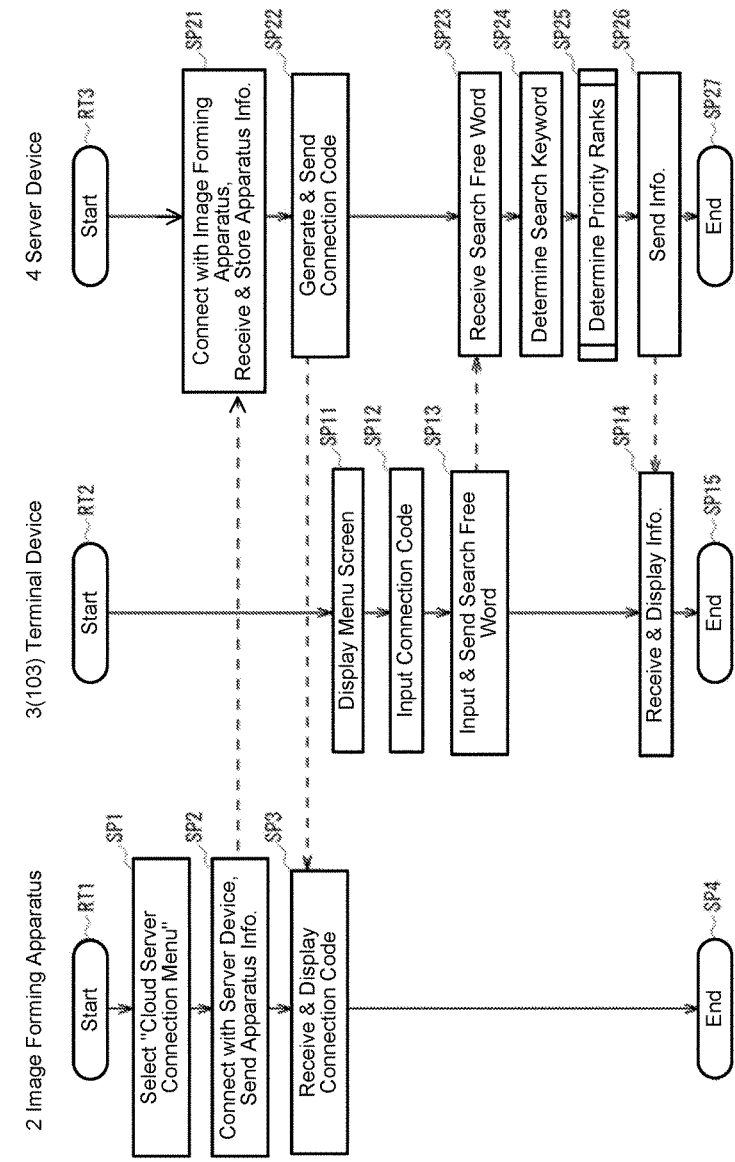
FIG. 5 is a sequence chart showing a search sequence.
Figure 6A:
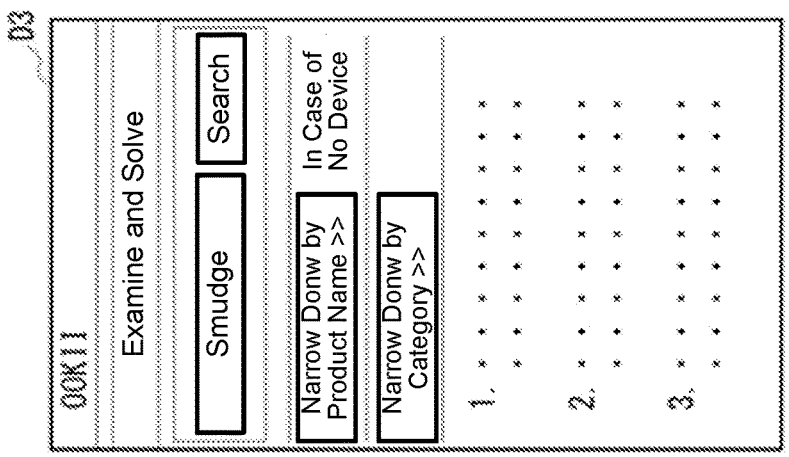
Figure 12A:
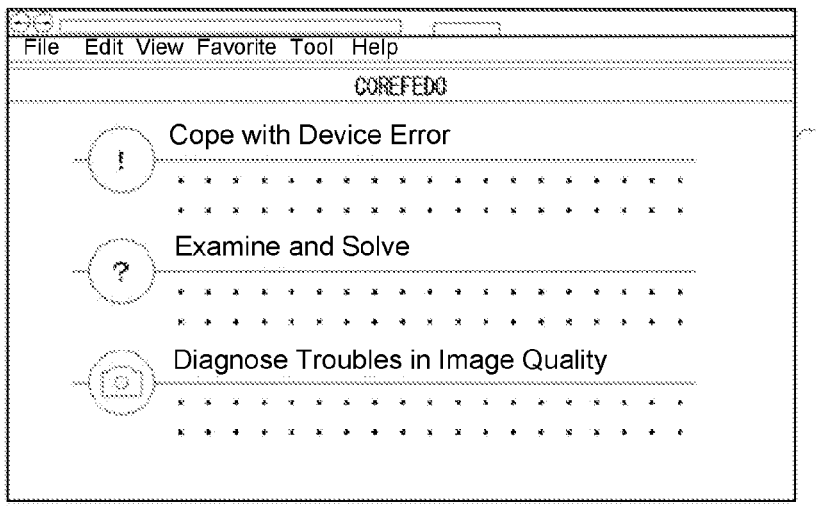
FIGS. 12A-12C are schematic diagrams showing the display screens of a terminal device by the second embodiment.
Figure 12B:
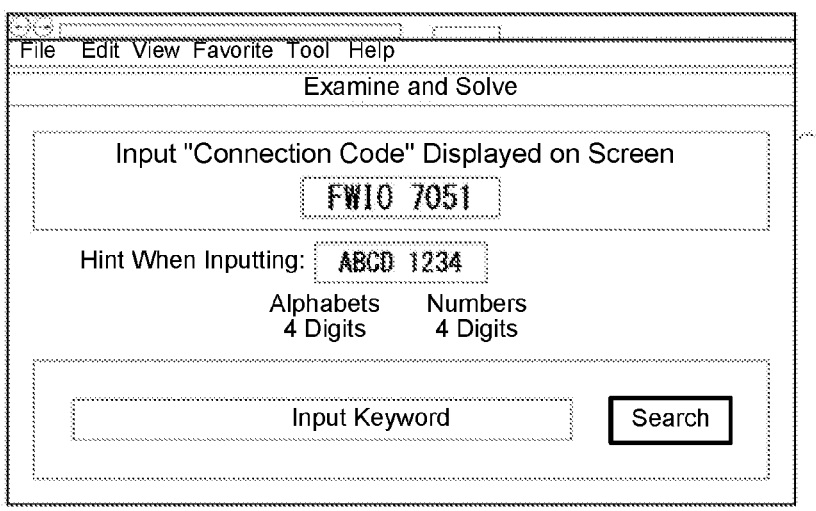
Figure 12C:
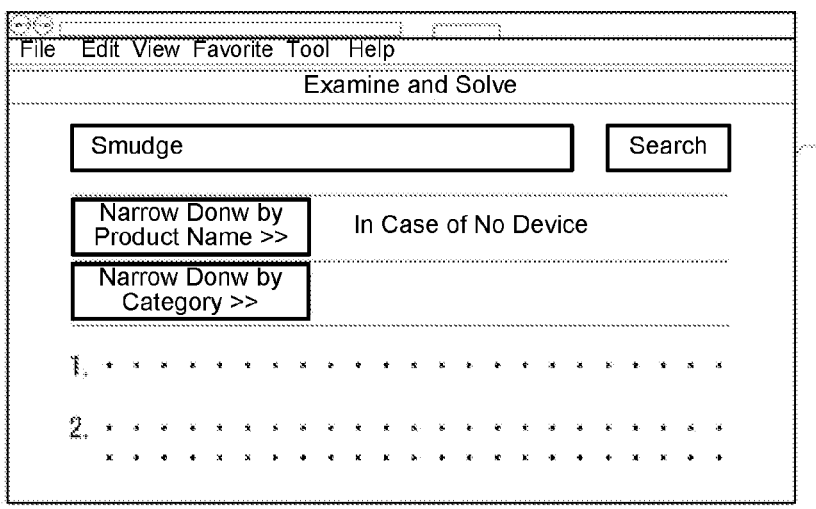

In the same manner as in the first embodiment, this information presentation system 101 performs a search process by performing individual processes according to the search sequence (FIG. 5) by the image forming apparatus 2, the terminal device 103, and the server device 4. At this time, as shown in FIGS. 12A-12C, the terminal device 103 utilizes a web browser to display a menu screen D4, an input screen D5, and a search result display screen D6 instead of the menu screen D1, the input screen D2, and the search result display screen D3 (FIG. 6A-6C).

2-1. Information Display Order Determination Process

Figure 7:
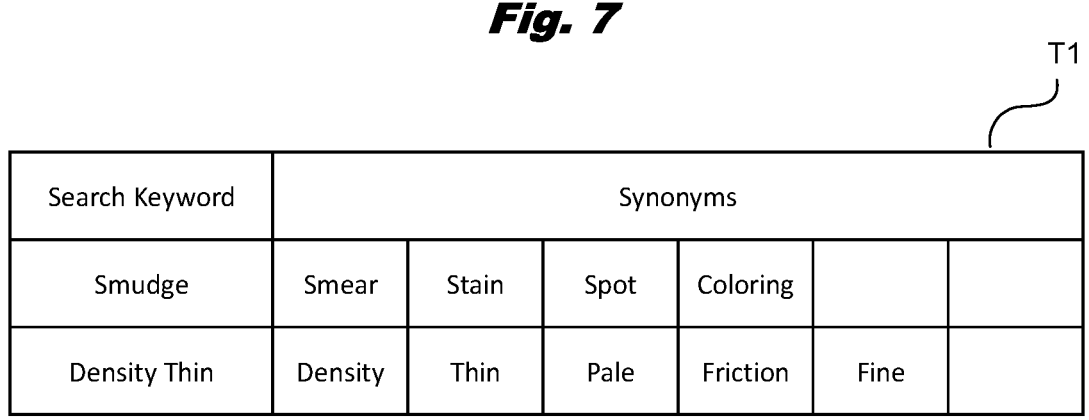
FIG. 7 is a schematic diagram showing a search synonym table.

In this second embodiment, the case where the search keyword is "density thin" is explained as an example. That is, it is assumed that the server device 4 has determined "density thin" as the search keyword by applying an analysis process to the search free word at SP24 (FIG. 5). This "density thin" is the search keyword that is determined, for example, if the user feels the density is thin about a print result and inputs a search free word containing phrases such as "density" and "thin" (FIG. 7).

Also, as shown in FIG. 13, in the server device memory part 82 (FIG. 4) of the server device 4, a search keyword information table T4 corresponding to the search keyword information table T2 (FIG. 8) is stored in advance.

In the search keyword information table T4, the search keyword "density thin" is given correspondence to four kinds of cause categories "A: Toner save setting", "B: Toner remaining amount small", "C: Density correction error", and "D: Others". Also, set in the search keyword information table T4 are three judgement items "Toner save setting", "Toner Low", and "Rotation number after density correction" that are relevant to the search keyword "density thin" for each cause category. Further, stored for each cause category is an answer including the cause and the coping method. Incidentally, the search keyword information table T4 can be updated at an arbitrary timing in the same manner as in the first embodiment.

In this second embodiment, the information display order is determined by the server device controller 81 performing processes according to the display order determination routine RT4 shown in FIG. 14 while referring to the search keyword information table T4 (FIG. 13).

Specifically, in the same manner as in the first embodiment, while executing the routine RT3 of the search sequence (FIG. 5), at SP25 the server device controller 81 reads the information display order determination program from the server device memory part 82 and executes it, thereby configuring the display order determination part 84 (FIG. 4) as a functional block inside it. This display order determination part 84 starts a display order determination routine RT5 (FIG. 14) and moves to SP41.

In the same manner as at SP31 (FIG. 10), at SP41 the display order determination part 84 reads from the server device memory part 82 the apparatus information given correspondence to the connection code received at SP23 (FIG. 5) (that is, the received connection code) and moves to the next SP42.

At this time, the display order determination part 84 reads the individual values of "Toner save setting", "Toner Low", and "Number of drum rotations after density correction" among the apparatus information as the information relevant to the judgement item corresponding to "density thin" that is the determined search keyword.

At SP42 the display order determination part 84 judges whether the toner save setting is made. If a positive result is obtained here, it indicates this corresponds to the only case where the judgement condition in the judgement item "Toner save setting" is "YES" in the search keyword information table T4 (FIG. 13), that is, the case where the cause category is "A: Toner save setting". Also, this signifies that the toner save setting should be released by the user's setting operation etc. in order to enhance the density. At this time, the display order determination part 84 moves to the next SP43.

At SP43 the display order determination part 84 determines priority ranks so as to prioritize the answer corresponding to the cause category "A: Toner save setting", and moves to the next SP49. That is, the display order determination part 84 judges that the cause category of the search keyword "density thin" is "A: Toner save setting" based on the apparatus information, and can preferentially present the corresponding information to the user.

On the other hand, if a negative result is obtained at SP42, it indicates that the cause category needs to be specified based on a judgement item other than "Toner save setting". At this time, the display order determination part 84 moves to the next SP44.

At SP44 the display order determination part 84 judges whether Toner Low holds, that is, whether the toner remaining amount is below the prescribed threshold value. If a positive result is obtained here, it indicates that this corresponds to the only case where the judgement condition in the judgement item "Toner Low" is "YES" in the search keyword information table T4 (FIG. 13), that is, the case where the cause category is "B: Toner remaining amount small". At this time, the display order determination part 84 moves to the next SP45.

At SP45 the display order determination part 84 determines priority ranks so as to prioritize the answer corresponding to the cause category "B: Toner remaining amount small", and moves to the next SP49. That is, the display order determination part 84 judges that the cause category for the search keyword "density thin" is "B: Toner remaining amount small" based on the apparatus information, and can preferentially present the corresponding information to the user.

On the other hand, if a negative result is obtained at SP44, it indicates that the cause category needs to be specified based on a judgement item other than "Toner save setting" or "Toner Low". At this time, the display order determination part 84 moves to the next SP46.

At SP46 the display order determination part 84 judges whether the number of drum rotations after density correction is larger than the value "250". If a positive result is obtained here, it indicates that this corresponds to the only case where the judgement condition in the judgement item "Number of drum rotations after density correction >250" is "YES" in the search keyword information table T4 (FIG. 13), that is, the case where the cause category is "C: Density correction error". Also, this signifies that it is estimated that the rotation number of the photosensitive drum 45 after the last density correction is relatively large, and that meanwhile the density deviated from the proper value. At this time, the display order determination part 84 moves to the next SP47.

At SP47 the display order determination part 84 determines priority ranks so as to prioritize the answer corresponding to the cause category "C: Density correction error", and moves to the next SP49. That is, the display order determination part 84 judges that the cause category for the search keyword "density thin" is "C: Density correction error" based on the apparatus information, and can preferentially present the corresponding information to the user.

On the other hand, if a negative result is obtained at SP46, it indicates that the cause category corresponds to "D: Others". At this time, the display order determination part 84 moves to the next SP48.

At SP48 the display order determination part 84 determines priority ranks for the multiple answers corresponding to the cause category "D: Others" according to the number of views by other users, and moves to the next SP49. This "D: Others" expresses a symptom that the density of a print result becomes thin in a different mode from any of "A: Toner save setting", "B: Toner remaining amount small", and "C: Density correction error". That is, the display order determination part 84 judges that the cause for the search keyword "density thin" cannot be specified based on the apparatus information, and can have information presented to the user based on the priority ranks according to the number of views by other users At SP49 the display order determination part 84 finishes the display order determination routine RT5 and returns its control to the server device controller 81. The server device controller 81 returns to the routine RT3 of the search sequence (FIG. 5), moves to the next SP26, and performs the same process as in the first embodiment.

2-2. Effects Etc.

In the above configuration, the information presentation system 101 by the second embodiment is designed so that a matter the user wants to know about the image forming apparatus 2 is inputted to the terminal device 103 as a search free word, a judgement process based on the search keyword information table T4 (FIG. 13) is performed in the server device 4, and presentation information is presented to the user upon determining the priority ranks. Also, the information presentation system 101 is designed so that the search keyword information table T4 can be updated.

Therefore, in the same manner as in the first embodiment, the information presentation system 101 can display information on the content corresponding to the search free word in an appropriate order according to the priority ranks determined according to the most recent search keyword information table T4 in the server device 4.

In this second embodiment, if the user recognizes that the density of a printed sheet in the image forming apparatus 2 is thin, the user inputs a word or phrase such as "density" and "thin" as the search free word. However, in the image forming apparatus 2, as the cause category where "density thin" occurs, there mainly are the case where the toner save setting is made, the case where the toner remaining amount is small, and the case where no density correction has been performed for a while. Therefore, in the image forming apparatus 2, in the same manner as in the first embodiment again, the coping method greatly differs among the cause categories.

Even in such a case as this, in the same manner as in the first embodiment, by utilizing the apparatus information in addition to the search keyword, the information presentation system 101 can have the server device 4 properly grasp the state of the image forming apparatus 2 and can present an appropriate coping method to the user.

In other respects also, the information presentation system 101 by the second embodiment can exhibit the same action effects as in the first embodiment.

According to the above configuration, in the information presentation system 101 by the second embodiment, utilizing the search keyword information table T4 corresponding to the search keyword "density thin", the search process and the display order determination process are performed in the same manner as in the first embodiment. Thereby, in the same manner as in the first embodiment, the information presentation system 101 can present the most recent information updated successively in the server device 4 to the user by the appropriate priority ranks determined according to the state of the image forming apparatus 2, and can allow the user to cope appropriately with the symptom occurring in the image forming apparatus 2.

3. Other Embodiments

Besides, described in the above-mentioned first embodiment was the case where the user was allowed to operate the image forming apparatus 2 and have the apparatus information sent to the server device 4 at the stage when the "Cloud server connection menu" is selected, in response to which the connection code was generated in the server device 4 and sent to the image forming apparatus 2 to be displayed on the display part 13A (FIG. 5).

However, this invention is not limited to this, but the apparatus information may be automatically sent to the server device 4 at various points of time, for example, every time a certain operation has been performed such as when one print job is completed in the image forming apparatus 2, at every prescribed time interval, or in combination of those two. In this case, for example, the connection code can be stored in the image forming apparatus 2 when notified from the server device 4, and can be read and displayed on the display part 13A in response to the user's operation. The same also applies to the second embodiment.

Also, described in the above-mentioned first embodiment was the case where the connection code was made as a combination of four alphabets and four numbers. However, this invention is not limited to this, but various kinds of connection codes may be constituted by combining an arbitrary number of various kinds of characters in an arbitrary order. Also, not only characters and numbers but also a bar code or a two-dimensional bar code may be used as the expression. In this case, they may be recognized by taking an image with a camera or the like incorporated in the terminal device 3, and converted into characters or the like. Alternatively, characters and numbers may also be imaged instead of having the user input them, and the characters, numbers, etc. may be recognized from the obtained image. The same also applies to the second embodiment.

Further, described in the above-mentioned first embodiment was the case where according to the cause category specified based on the search keyword and the apparatus information in the server device 4, the answer was sent to the terminal device 3 and displayed on the terminal device display part 72 of the terminal device 3. However, this invention is not limited to this, but the answer may be sent from the server device 4 to the image forming apparatus 2, and be displayed on the display part 13A of the image forming apparatus 2 or printed on a sheet and presented to the user. Also, the information presented to the user is not limited to characters but may be converted into voice for the user to listen to, or the work procedure may be created in advance as a video and played back. Essentially, the user only needs to understand and execute the coping method for the symptom that occurred in the image forming apparatus 2. The same also applies to the second embodiment.

Further, described in the above-mentioned first embodiment was the case where the user was allowed to use the terminal device 3 to display the input screen D2 (FIG. 6B) on the terminal device display part 72 of the terminal device 3 and input a search free word through the terminal device input part 73, and the search result display screen D3 (FIG. 6C) was displayed to present the search result to the user. However, this invention is not limited to this, but the user may be allowed to use the display part 13A and the operation part 13B of the image forming apparatus 2 to have the search free word inputted and the search result presented. In this case, there is no need to have a connection code inputted. Also, in this case, instead of sending in advance the apparatus information to the server device 4, the apparatus information may be sent to the server device 4 together with the search free word inputted by the user. In this case, generation and transmission of the connection code may be omitted. The same also applies to the second embodiment.

Further, described in the above-mentioned first embodiment was the case where both a search free word and the connection code were inputted to the input screen D2 (FIG. 6B) displayed on the terminal device display part 72 of the terminal device 3 and sent to the server device 4, and a search process utilizing the both was performed in the server device 4. However, this invention is not limited to this, but the user may be allowed to input only either one of the search free word or the connection code to be sent to the server device 4, and the search result based on the sent search free word or connection code may be presented to the user. In this case, if the user is not satisfied with the search result and inputs the remaining one, information may be presented with priority ranks based on the both. The same also applies to the second embodiment.

Further, described in the above-mentioned first embodiment was the case where the search keyword was "smudge" as an example, and described in the second embodiment was the case where the search keyword was "density thin" as an example. However, this invention is not limited to these, but various kinds of words and phrases such as "wrinkle occurrence" and "printing skewed" that can be supposed in the image forming apparatus 2 may be set as the search keyword. In this case, the search keyword information table (FIG. 8 and FIG. 13) corresponding to each search keyword may be prepared and stored in the server device memory part 82 in advance. Also, in this case, the search keyword may be determined based on the search synonym table T1 (FIG. 7) by the display order determination part 84 or the like for example.

Further, described in the above-mentioned first embodiment was the case where multiple answers were presented to the user with priority ranks set according to the number of views by other users only when the cause category was "C: Others" because the cause could not be specified based on the judgement condition. However, this invention is not limited to this, but the priority ranks may be set considering also the number of views by other users when multiple answers exist although the cause could be specified based on the judgement condition for example. The same also applies to the second embodiment.

Further, described in the above-mentioned first embodiment was the case where if the cause category determined according to the search keyword could be specified, the answer corresponding to this cause category was presented with its priority rank increased to the user along with other information. However, this invention is not limited to this, but only the answer given correspondence to the specified cause category may be presented as information to the user. The same also applies to the second embodiment.

Further, described in the above-mentioned first embodiment was the case where the search sequence (FIGS. 6A-6C) was finished by presenting to the user the cause and the coping method as the search result through the terminal device 3. However, this invention is not limited to this, but if the user who could not solve the symptom after the search result was presented performs a prescribed operation instruction, an operator (not shown) standing by at a service center S1 (FIG. 1) may be contacted from the terminal device 3 through telephone or e-mail, and another coping method etc. may be introduced from the operator. In this case, by referring to the apparatus information stored in the server device 4 and the search free word inputted by the user, the operator can grasp what the user wants to know, the state of the image forming apparatus 2, etc., and can smoothly present appropriate information. The same also applies to the second embodiment.

Further, described in the above-mentioned first embodiment was the case where this invention was applied to the image forming apparatus 2 that was an MFP. However, this invention is not limited to this but may be applied to various kinds of electronic equipment, such as a printer, a facsimile machine, and a copier, that form an image on a medium. The same also applies to the second embodiment.

Further, this invention is not limited to the above-mentioned embodiments and other embodiments. That is, this invention extends its scope of application also to embodiments that arbitrarily combine part or the whole of the above-mentioned embodiments and the above-mentioned other embodiments, and embodiments that extract part of them.

Further, described in the above-mentioned first embodiment was the case where the information presentation system 1 as an information presentation system was configured of the image forming apparatus 2 as an image forming apparatus, the terminal device 3 as a terminal device, and the server device 4 as a server device. In this case, the image forming apparatus was configured of the image forming units 25 as an image forming part, the toner remaining amount detection part 65 and the temperature and humidity sensor 66 as sensors, and the image forming apparatus communication part 12 as an image forming apparatus communication part. Also, the terminal device was configured of the terminal device input part 73 as a terminal device input part, the terminal device display part 72 as a terminal device presentation part, and the terminal device communication part 74 as a terminal device communication part. Further, the server device was configured of the server device communication part 83 as a server device communication part, the server device memory part 82 as a server device memory part, and the display order determination part 84 as a presentation order determination part.

However, this invention is not limited to this, but the information presentation system may be configured of an image forming apparatus, a terminal device, and a server device having other kinds of configurations. In this case, the image forming apparatus may be configured of an image forming part, sensors, and an image forming apparatus communication part having other kinds of configurations. Also, the terminal device may be configured of a terminal device input part, a terminal device presentation part, and a terminal device communication part having other kinds of configurations. Further, the server device may be configured of a server device communication part, a server device memory part, and a presentation order determination part having other kinds of configurations.

This invention can be utilized, for example, by a printer etc. that has an image forming function and communicates with an external server etc. through a network.

(Apparatus Information)

The apparatus information of the invention is various types of information related to the apparatus, which is composed with, for example, the remaining amount of developer contained in the image forming apparatus, the number of rotation of the photosensitive drum, the number of printed sheets, lives of consumables (which are to be replaced when worn out), detection results by the sensors (which are temperature or humidity measured by the sensors), and a sheet size input by the user.

(Answers)

The answers of the invention are various types of information that users who look for solutions to cope with their troubles are expected to follow. The answers are selected based on the apparatus information. Examples of the answers are shown in FIG. 8 and FIG. 13.

What is claimed is:

1. An information presentation system comprising an image forming apparatus, a terminal device and a server device that are connected through a network, wherein the image forming apparatus is provided with an image forming part that forms an image on a medium, a sensor that detects a state of the image forming apparatus, the state of the image forming apparatus including at least one of a rotation number of a photosensitive drum, a toner remaining amount, temperature and humidity inside the image forming apparatus at time when a symptom occurs in the image forming apparatus, an image forming apparatus processor that generates image forming apparatus information from the state of the image forming apparatus, an image forming apparatus memory that stores and answer, and an image forming apparatus communication part that communicates with the server device, the terminal device is provided with a terminal device input part that receives a search keyword, a terminal device presentation part that presents information to the user, and a terminal device communication part that communicates with the server device, the server device is provided with a server device communication part that communicates with the image forming apparatus and the terminal device, a server device memory part that stores multiple answers that are information to be presented to the user in order to cope with symptoms that occur in the image forming apparatus, the multiple answers including at least one possible answer that is not stored in the image forming apparatus memory and the multiple answers being updatable, a server device processor that generates a connection code from the image forming apparatus information received from the image forming apparatus and determines at least one possible answer from the multiple answers to cope with the symptom based on a combination of the search keyword received from the terminal device and the image forming apparatus information, a presentation order determination part that determines priority ranks of the at least one possible answer to present to the user based on a degree of relevancy of the at least one possible answer to the search keyword, the image forming apparatus sends, to the server device by the image forming apparatus communication part, the image forming apparatus information, the server device transmits the connection code generated from the image forming apparatus information to the image forming apparatus, the terminal device receive an input of the connection code presented on the image forming apparatus and sends, to the server device by the terminal device communication part, the received input of connection code and the search keyword for searching for the answers on the symptom that occurred in the image forming apparatus, the server device determines the at least on possible answer from the multiple answers based on the image forming apparatus information and the search keyword and a presentation order of the at least one possible answer to be presented to the user based on the degree of relevancy of the at least one possible answer to the search keyword, and sends the at least one possible answer and the presentation order to the terminal device by the server device communication part, and the terminal device presents, to the user by the terminal device presentation part, the at least one possible answer in an order according to the presentation order.

2. The information presentation system according to claim 1, wherein the image forming apparatus information is composed with one or more of elements selected from a number of printed sheets, a remaining amount of developer contained in the image forming apparatus, lives of consumables, temperature or humidity measured by the sensor and a sheet size input by the user.

3. The information presentation system according to claim 1, wherein the server device processor generates the connection code with correspondence to the image forming apparatus information received from the image forming apparatus, sends the connection code to the image forming apparatus, and stores the connection code with correspondence to the image forming apparatus information in the server device memory part, the image forming apparatus displays the connection code received from the server device on an image forming apparatus display part, the terminal device further has the connection code inputted through the terminal device input part in addition to the search keyword, and sends the connection code to the server device through the terminal device communication part, and the server device determines the answers to be presented to the user and the presentation order based on the image forming apparatus information stored with correspondence to the connection code received from the terminal device and the search keyword.

4. The information presentation system according to claim 1, wherein the server device memory part further stores multiple search keywords and multiple cause categories, the search keywords being determined based on the search keyword, each of the search keywords corresponding to at least one of the cause categories, if the determined search keyword corresponds to more than one of the cause categories, the presentation order determination part determines the at least one possible answer to be presented to the user and the presentation order upon specifying one of the cause categories based on the image forming apparatus information.

5. The information presentation system according to claim 4, wherein the presentation order determination part determines whether or not the cause categories satisfy predetermined conditions, and when one of the cause categories satisfies the predetermined conditions, the presentation order determination part alters the presentation order.

6. The information presentation system according to claim 1, wherein if a prescribed server connection instruction is performed by the user, the image forming apparatus sends the image forming apparatus information with the image forming apparatus communication part to the server device.

7. The information presentation system according to claim 1, wherein if a prescribed operation has been performed, the image forming apparatus sends the image forming apparatus information with the image forming apparatus communication part to the server device.

8. An information presentation method, comprising:

detecting a state of an image forming apparatus by a sensor, the state of the image forming apparatus including at least one of a rotation number of a photosensitive drum, a toner remaining amount, temperature and humidity inside the image forming apparatus at time when a symptom occurs in the image forming apparatus, generating image forming apparatus information from the state of the image forming apparatus, transmitting the image forming apparatus information in a server device, generating, by the server device, a connection code from the image forming apparatus information and transmitting the connection code to the image forming apparatus, receiving, by a terminal device, an input of the connection code presented on the image forming apparatus and a search keyboard for searching for answers on the symptom that occurred in the image forming apparatus, receiving, by the server device, the connection code and the search keyword from an input part of the terminal device, determining, by the server device, at least one possible answer from multiple answers stored in the server device to cope with the symptom that occurred in the image forming apparatus based on the search keyword received from the terminal device and the image forming apparatus information, the multiple answers including the at least one possible answer that is not stored in an image forming apparatus memory and the multiple answers being updatable, determining, by the server device, a presentation order of the at least one possible answer based on a degree of relevancy of the at least one possible answer to the search keyword, transmitting the at least one possible answer and the presentation order form the server device to the terminal device, and presenting, by the terminal device, the at least one possible answer to a user in the presentation order.

* * * * *